United States Patent [19]

Lee

[11] Patent Number: 4,663,663
[45] Date of Patent: May 5, 1987

[54] DIGITAL COLOR IMAGE PROCESSING METHOD EMPLOYING CONSTRAINED CORRECTION OF COLOR REPRODUCTION FUNCTIONS

[75] Inventor: Hsien-Che Lee, Penfield, N.Y.

[73] Assignee: Eastman Kodak Company, Rochester, N.Y.

[21] Appl. No.: 730,884

[22] Filed: May 6, 1985

[51] Int. Cl.[4] .......................... G03F 3/08; H04N 1/46; G03B 27/80
[52] U.S. Cl. ...................................... 358/80; 358/75; 355/38
[58] Field of Search ................. 358/75, 76, 78, 80, 358/280, 283, 284, 256; 382/18; 355/38, 35, 40, 41, 77, 88, 68

[56] References Cited

U.S. PATENT DOCUMENTS

| 4,079,388 | 3/1978 | Takahama et al. | 355/38 |
|---|---|---|---|
| 4,168,120 | 9/1979 | Freier et al. | 355/38 |
| 4,244,653 | 1/1981 | Asai et al. | 355/38 |
| 4,339,517 | 7/1982 | Akimoto | 355/38 |
| 4,410,909 | 10/1983 | Ueda et al. | 358/75 |
| 4,467,364 | 8/1984 | Konagaya | 358/280 |
| 4,472,736 | 9/1984 | Ushio et al. | 358/75 |
| 4,492,458 | 1/1985 | Bickl et al. | 355/38 |
| 4,561,016 | 12/1985 | Jung et al. | 358/80 |
| 4,566,786 | 1/1986 | Fürsich et al. | 355/38 |
| 4,577,961 | 3/1986 | Terashita | 355/38 |
| 4,589,766 | 5/1986 | Fürsich et al. | 355/38 |
| 4,601,571 | 7/1986 | Yuasa et al. | 355/38 |

OTHER PUBLICATIONS

"A New Approach to Programming in Photomechanical Reproduction," Yu. Ovchinnikov et al, W. Banks IPC Science and Technology Press, Guildford, England, 1974, pp. 160–163, The Twelfth Iarigai Conference Processings, Versailles, France.

"Tone Correction of Color Picture by Histogram Modification," by Yoichi Miyake; Nippon Shashin Sakhaishi, vol. 48(2), pp. 94–101, 1980.

Primary Examiner—James J. Groody
Assistant Examiner—Randall S. Svihla
Attorney, Agent, or Firm—Thomas H. Close

[57] ABSTRACT

In a method for processing digital color images derived from photographic film, the method employing color reproduction functions generated by normalizing random samples of color values from different colors, oversampling of color values from color saturated textures such as green grass and blue sky noise can distort the randomness of sampling and result in unwanted color shifts in the processed digital images. The problem is solved by constraining the shapes of and relationships between the color reproduction functions in conformance with a priori knowledge of the photographic film, and photographic conditions. According to one aspect of the invention, the shapes of the color reproduction functions are constrained in conformance with the D-Log H curves of a color photographic film. According to another aspect of the invention, the relationships between the color reproduction functions are constrained in conformance with the assumption that the illuminant employed to expose the film was a black body radiator.

12 Claims, 15 Drawing Figures

DIGITAL COLOR IMAGE PROCESSING METHOD EMPLOYING CONSTRAINED CORRECTION OF COLOR REPRODUCTION FUNCTIONS

TECHNICAL FIELD

The present invention relates to methods of processing digital color images derived from photographic film, and more particularly to such methods employing a plurality of color reproduction functions generated by normalizing samples of color values selected from the informational portions of the image. The color reproduction functions are applied to the digital color image to produce a processed digital color image.

BACKGROUND ART

A digital image processing method has been proposed wherein a random sample of tone values from the informational portion of the digital image is normalized to produce a tone reproduction function. The tone reproduction function is then applied to the digital image to produce a processed digital image. This procedure was frst proposed in the article entitled "A New Approach to Programming in Photomechanical Reproduction" by Yu. Ovchinnikov et al, 12th IARIGAI Conference Proceedings, Versailles, France, Editor W. Banks, IPC Science and Technology Press, Guildford, England, 1974, pages 160–163. It has been discovered that the success of the method depends strongly upon choosing a truly random sample of tone values from the image. An improvement to the randomness of the sampling by selecting the tone values from a "floating" image dependent contrast interval having certain preferred statistical properties is disclosed in copending U.S. patent application Ser. No. 730,630. A further improvement wherein the overall contrast of the image is adjusted as a function of the standard deviation of the tone values of the image and the tone reproduction function is expressed in terms of the standard normal variate is disclosed in copending U.S. patent application Ser. No. 730,629.

An extension of the method to processing digital color images to adjust both tone-scale and color balance is disclosed in copending U.S. patent application Ser. No. 730,627. In the extension to digital color images a color reproduction function is produced for each of a plurality of color components (e.g., red, green and blue) in the digital image by normalizing respective samples of color values selected from the informational portions of the image. The color reproduction functions thus produced are then applied to the respective color components of the digital color image to produce the processed digital color image. An output device is calibrated so that combinations of color values having equal values of the standard normal variate in the color reproduction functions produce a neutral (gray) color.

This method generally produces an aesthetic improvement in the appearance of processed color images. However, when the digital color image is derived from a color photographic film image containing highly saturated textures such as large areas of green grass or blue sky noise, the randomness of the sampling procedure for producing the samples of color values for normalization is subject to influence, thereby distorting the color reproduction functions and causing unwanted color shifts in the processed images.

It is apparent from the examination of such processed images that further improvement in the digital color image processing method is desirable.

It is the object of the present invention to provide an improved digital color image processing method of the type described above wherein the appearance of processed images having highly saturated textured areas such as green grass and blue sky noise are improved.

DISCLOSURE OF THE INVENTION

The object of the invention is achieved by constraining the shapes and relationships between the color reproduction functions in accordance with a priori knowledge of the response of the photographic film.

According to one aspect of the invention, the shapes of the color reproduction functions are constrained in conformance with the D-log H curves of the color photographic film used to produce the original image. According to another aspect of the invention, the relationships between the color reproduction functions are further constrained in conformance with the assumption that the illuminant employed to expose the original photographic image was a black body radiator. These two constraints are used to make adjustments to the color reproduction functions after they have been generated.

FIG. 2 is a graph showing how a color reproduction function is generated. The upper left-hand quadrant of the graph shows a histogram labeled A of a sample of color values (photographic densities) taken from informational portions of the image. The sample is plotted against relative frequency of occurrence. The lower right-hand quadrant of the graph shows a histogram labeled B of a normal (Gaussian) distribution showing the relative frequency of occurrence vs the standard normal variate Z. The standard normal variate Z is a scale in units of standard deviations of a Gaussian distribution. In the upper right-hand quadrant is shown a function labeled C that converts the distribution of the measured sample of color values to the normal distribution. This function relates any given color value in the measured distribution to a value of Z. The Z value is a dimensionless quantity representing numbers of standard deviations. To process the digital image, the measured color values in the digital color image are converted to Z values using the color reproduction function. The resulting dimensionless quantities are given dimension by multiplying the Z values by a constant to determine the contrast of the processed image, and by adding a constant to the Z values in the respective colors to adjust the color balance of the processed image. The additive constants are chosen such that equal Z values in all three colors produce a neutral (gray) color.

If the samples of color values used to generate the color reproduction function were not truly random, the shapes and relationships of the color reproduction functions will be distorted, resulting in unwanted color shifts in the processed image.

The physical laws that govern the phenomena involved in color photography impose certain constraints on the possible shapes and interrelationships between the color reproduction functions. The inventor has discovered that these constraints can be applied to the color reproduction functions to reduce the distortion induced by non random sampling, and thereby improve the appearance of the processed digital image.

One constraint requires that the red, green and blue color reproduction functions be consistent with the corresponding D-log H curves of the color photographic film. For example, if the flim D-log H curves are approximated by straight lines, the color reproduction functions should also have linear relationships between the red, green and blue color reproduction functions. Another constraint is based upon the observation that the commonly used light sources for color photography can be approximated by blackbody radiators at different color temperatures. This implies certain restrictions on the relationship between the color reproduction functions.

The D-Log H Constraint

The D-Log H curves of a color negative film usually have a large straight line portion above the base plus fog densities, FIG. 3 shows an example for Kodak VR 200 film in red, green and blue status M densities. The D-log H curves can be approximated by straight lines, and the error will mostly occur in the toe regions of the curves where colors are not readily perceived by a human observer. Therefore, let the D-log H curves be approximated by:

$$D_r = A_r * \log H_r + B_r \quad (1)$$

$$D_g = A_g * \log H_g + B_g \quad (2)$$

$$D_b = A_b * \log H_b + B_b, \quad (3)$$

where $D_r$, $D_g$, $D_b$, $H_r$, $H_g$ and $H_b$ are red green and blue densities and exposures respectively; $A_r$, $A_g$ and $A_b$ are the slopes of the D-log H curves; and $B_r$, $B_g$ and $B_b$ are the intercepts.

For a given illuminant $(H_r, H_g, H_b)$, define the constants $$A = \log H_g - \log H_r \quad (4)$$

$$C = \log H_b - \log H_r; \quad (5)$$

$$S_{gr} = A_g / A_r \quad (6)$$

$$S_{br} = A_b / A_r; \text{ and} \quad (7)$$

$$I_{gr} = A_g * A + B_g - A_g * B_r / A_r \quad (8)$$

$$I_{br} = A_b * C + B_b - A_b * B_r / A_r \quad (9)$$

then, from the foregoing:

$$D_g = S_{gr} * D_r + I_{gr} \quad (10)$$

$$D_b = S_{br} * D_r + I_{br}. \quad (11)$$

For a given film type, $I_{gr}$ and $I_{br}$ are uniquely determined by the scene illuminant. Equations (10) and (11) show that if the red, green and blue densities of a neutral surface are measured under a given illuminant the green and blue densities will be linear functions of the red density. The slopes $S_{gr}$ and $S_{br}$ depend only on the film type and the intercepts $I_{gr}$ and $I_{br}$ are functions of both the film type and the illuminant. These two equations (10), (11) are derived from the film D-log H curves and they form a linear constraint on the shapes of the color reproduction functions.

Since $D_r$, $D_g$ and $D_b$ are measurable quantities for a given image, $I_{gr}$ and $I_{br}$ can be determined by fitting straight lines to the measured data (using estimated neutral densities, i.e. equal Z values from the different color reproduction functions,). FIG. 4 shows an example of the color reproduction functions generated for a particular image. Several arbitrarily selected neutral points on the curves at equal Z values representing estimated neutral points in the image are indicated. In FIG. 5, the green and blue color values are shown plotted (dashed lines) against the red color values for each neutral point. A line having a slope equal to $S_{br}$ is fit by linear regression through the points representing blue/red values. The intersection of the line with the blue axis is the value $I_{br}$. Similarly, a line having a slope equal to $S_{gr}$ is fitted by linear regression through the points representing the green/red values. The intersection of this line with the green axis is the value $I_{gr}$.

Now that $S_{gr}$, $S_{br}$, $I_{gr}$ and $I_{br}$ are known, the shapes of the blue and red color reproduction functions can be recalculated using equations (10) and (11). Equations (10) and (11) are rewritten as follows:

$$D'_r = \frac{D_g - I_{gr}}{S_{gr}} \quad (12)$$

$$D'_b = S_{br} \frac{D_g - I_{gr}}{S_{gr}} + I_{br}. \quad (13)$$

where $D'_r$ and $D'_b$ are the corrected values of the red and blue color reproduction functions, and $D_g$ is the value of the green color reproduction function at any given Z value. The D-log H linear constraint is used to reshape the blue and red color reproduction functions using the green color reproduction function as a reference. FIG. 6 shows the corrected color reproduction functions generated from the color reproduction functions shown in FIG. 4 by applying the D-log H linear constraint.

The Illuminant Constraint

The spectral energy distribution of a photographic light source is often specified by the so-called color temperature. The idea is to approximate the spectral energy distribution of a light source by that of an ideal black body radiator at a particular temperature. This approximation is very good for tungsten lamps, reasonably good for daylight and photographic flash bulbs, and not so good for fluorescent lamps. Assuming that most commonly employed photographic light sources can be approximated as a black body radiator at some specified temperature, a constraint on the relationship between the color reproduction functions from a photographic film image can be derived as follows.

The spectral energy distribution of a black body radiator is given by Plank's Radiation Law:

$$E(\lambda) = (C_1/\lambda^5) * [1.0/(\exp(C_2/\lambda T) - 1)], \quad (14)$$

where
$E(\lambda)$ is the energy at wavelength $\lambda$,
T is the temperature of the blackbody, and
$C_1$ and $C_2$ are constants.
For T much less than 20,000° K., the relation simplifies to:

$$E(\lambda) = (C_1/\lambda^5) * \exp(-C_2/\lambda T) \quad (15)$$

Since most film spectral sensitivity functions have a relatively narrow band response (about 100 nm) and since the color temperature of most light sources is much less than 20,000° K., a piece-wise linear approximation of equation (15) can be used. Actual computation using least squares fit shows that the piece-wise linear approximation of equation (15) within the ranges of $\lambda=400-500$, 500–600, and 600–700 nm is very good with error less than 1% for most wavelengths. Therefore, equation (15) can be approximated by:

$$E(\lambda)=p(T)\times\lambda q(T) \text{ for } \lambda_1\leq\lambda\leq\lambda_2 \text{ and } \lambda_2-\lambda_1<100 \text{ nm}, \quad (16)$$

where $$p(T) = (\lambda_2 - \lambda_1)^{-3}\left[12\int_{\lambda_1}^{\lambda_2}\frac{C_1}{\lambda^4}e^{-C_2/\lambda T}d\lambda - 6\int_{\lambda_1}^{\lambda_2}(\lambda_2-\lambda_1)\frac{C_1}{\lambda^5}e^{-C_2/\lambda T}d\lambda\right],$$

and $$q(T) = (\lambda_2 - \lambda_1)^{-4}\left[4(\lambda_2^3 - \lambda_1^3)\int_{\lambda_1}^{\lambda_2}\frac{C_1}{\lambda^5}e^{-C_2/\lambda T}d\lambda - 6(\lambda_2^2 - \lambda_1^2)\int_{\lambda_1}^{\lambda_2}\frac{C_1}{\lambda^4}e^{-C_2/\lambda T}d\lambda\right].$$

Now let $S_r(\lambda)$, $S_g(\lambda)$ and $S_b(\lambda)$ be the spectral sensitivity functions of the red, green and blue layers of the film, respectively, and let them have a normalized area of 1. Then the effective image irradiance is related to the energy through the film sensitivity by:

$$E_r=\int S_r(\lambda)*E(\lambda)d\lambda=p(T)*\int \lambda S_r(\lambda)d\lambda+q(T)*\int S_r(\lambda)d\lambda=p(T)*\lambda_r+q(T) \quad (17)$$

similarly, $$E_g=p(T)*\lambda_g+q(T) \quad (18)$$

$$E_b=p(T)*\lambda_b+q(T) \quad (19)$$

where $$\lambda_r=\int \lambda S_r(\lambda)d\lambda,$$

$$\lambda_g=\int \lambda S_g(\lambda)d\lambda$$

and $$\lambda_b=\int \lambda S_b(\lambda)d\lambda$$

are the effective mean wavelengths of the red, green and blue layers of the film. The red exposure $H_r$, for example, is the effective image irradiance $E_r$ times the exposure time $\Delta t$.

Since equations (17)–(19) are of the same form as equation (16) for the purpose of calculating red, green and blue exposures of a given film, each film layer can be represented with a single wavelength, and different light sources will be represented as black body radiators at different temperatures T. Therefore one can write:

$$E_r=(C_1/\lambda_r^5)* \exp(-C_2/\lambda_r T) \quad (20)$$

$$E_g=(C_1/\lambda_g^5)* \exp(-C_2/\lambda_g T) \quad (21)$$

$$E_b=(C_1/\lambda_b^5)* \exp(-C_2/\lambda_b T), \quad (22)$$

where $\lambda_r$, $\lambda_g$ and $\lambda_b$ are functions of the film type and other factors involved in the imaging and measuring process.

Combining equations (4)–(11) and (20)–(22) gives:

$$I_{br}=m*I_{gr}+d, \quad (23)$$

where $$m=(A_b/A_g)*[(\lambda_r/\lambda_b-1)/(\lambda_r/\lambda_g-1)],$$

and $$d = A_b*\left[5\ln\frac{\lambda_r}{\lambda_b}+\frac{B_b}{A_b}-\frac{B_r}{A_r}\right] - m*A_g*\left[5\ln\frac{\lambda_r}{\lambda_g}+\frac{B_g}{A_g}-\frac{B_r}{A_r}\right]$$

ln denoting a natural logarithm. Thus, equation (23) shows that there is a linear constraint on the color of various light sources which can be approximated by black body radiators. To apply the linear illuminant constraint to the color reproduction functions, $I_{gr}$ and $I_{br}$ are computed, as described above with reference to the D-log H linear constraint, for a number of images from a given film type. FIG. 7 shows a plot of $I_{gr}$ vs. $I_{br}$ for such a collection of images. A straight line is fit through the resulting collection of points using the least squares fit method. If the point ($I_{gr}$, $I_{br}$) of an input image lies very far from this line it is assumed that the estimated neutral densities have been biased by oversampling of a highly saturated color. To correct for this, the point ($I_{gr}$, $I_{br}$) is moved back toward the line (as shown by the point labeled P in FIG. 7) to a point ($I'_{gr}$, $I'_{br}$) labeled P'. Using the correct intercepts ($I'_{gr}$ and $I'_{br}$), the blue and red color reproduction functions are recomputed from equations (12) and (13).

FIG. 8 shows an example of the corrected color reproduction functions using both the D-log H linear constraint and the illuminant constraint. The correction for illuminant color can be less than the full amount needed to bring the point ($I_{gr}$, $I_{br}$) all the way back to the illuminant line since the illuminant constraint does not take into account the mutual illumination between objects and the black body approximation may not be entirely accurate.

It should be noted that the two constraints correct for different errors in the color reproduction function. Basically the D-log H linear constraint corrects the shapes of the color reproduction functions and the illuminant constraint corrects the separation distance between the color reproduction functions. If oversampling of a saturated color occurs in a fairly narrow density range, the shape of the reproduction function is distorted in that range. The D-log H linear constraint will reshape the red and blue color reproduction functions according to equations (12) and (13), taking the green color reproduction function as a reference. Because the green color reproduction function is comparatively more stable than the other two under different illuminants it is taken as the reference and its shape is left unchanged.

The illuminant constraint, by shifting the relative distances between the color reproduction functions, corrects the color balance errors in the direction perpendicular to the illuminant line (green vs magenta). Errors in the direction of the illuminant line (red-yellow vs cyan-blue) are not corrected by this constraint. However, it should be noted that human visual perception is less sensitive to color errors in this direction.

The color problems most commonly encountered in the digital color image processing method employing the color reproduction functions generated by normalizing random samples of color values, i.e. oversampling due to green grass textures and blue sky noise are corrected by applying the constraints outlined above. Usually, the illuminant constraint corrects the green-magenta color error, and the D-log H constraint corrects the shape distortion of the tone reproduction curves from oversampling the high density blue sky areas.

BRIEF DESCRIPTION OF THE DRAWINGS

The invention is described with reference to the drawings, wherein.

MODES OF CARRYING OUT THE INVENTION

Figure 1:
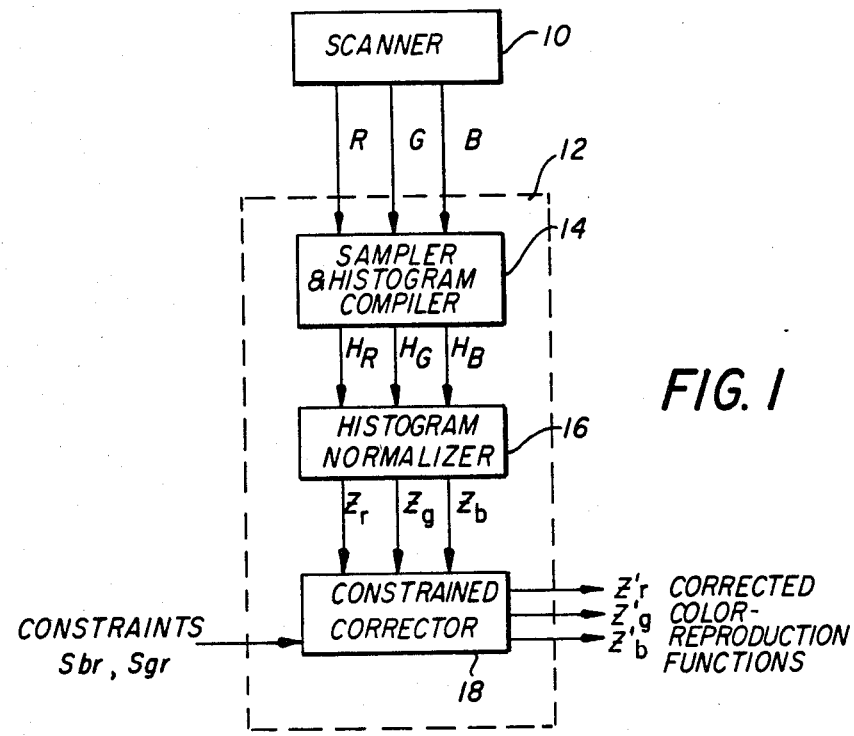
FIG. 1 is a block diagram illustrating apparatus for practicing the basic steps of generating and correcting color reproduction functions according to the present invention.
Figure 4:
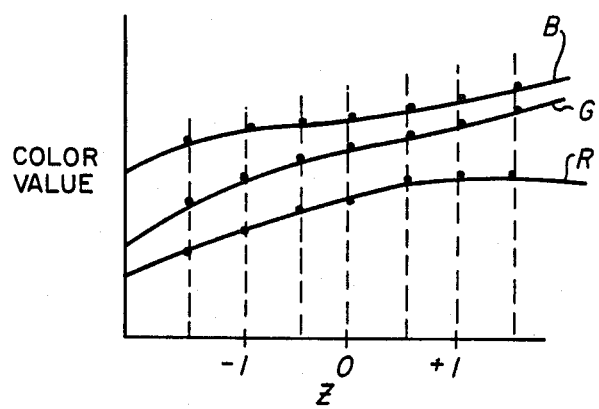
FIG. 4 is a graph illustrating a typical set of color reproduction functions for processing a digital color image.

The method of digital color image processing according to the present invention will first be described with reference to FIG. 1. In FIG. 1, a scanner 10 scans a color film image to provide a digital color image signal having three color components R, G and B. A digital computer 12 receives the digital color image signal and is programmed, as described below, to provide a sampler and histogram compiler 14 for sampling the color values from the informational portion (edges) of the digital image and compiling histograms $H_R$, $H_G$, and $H_B$ of the sampled color values in the respective colors. A histogram normalizer 16 receives the histogram data $H_R$, $H_G$, and $H_B$ and generates a set of functions $Z_r$, $Z_g$ and $Z_b$ that normalize the respective histograms. The functions $Z_r$, $Z_g$ and $Z_b$ are the color reproduction functions graphically illustrated in FIG. 4. A constrained corrector 18 receives the color reproduction functions and a set of constraints (e.g. $S_{gr}$ and $S_{br}$ as defined in equations (6) and (7) above) for the image being processed and corrects the color reproduction functions in conformance with the constraints. The constrained corrector 18 produces as an output a set of corrected color reproduction functions $Z'_r$, $Z'_g$ and $Z'_b$. The digital color image is then processed using the corrected color reproduction functions.

Figure 9:
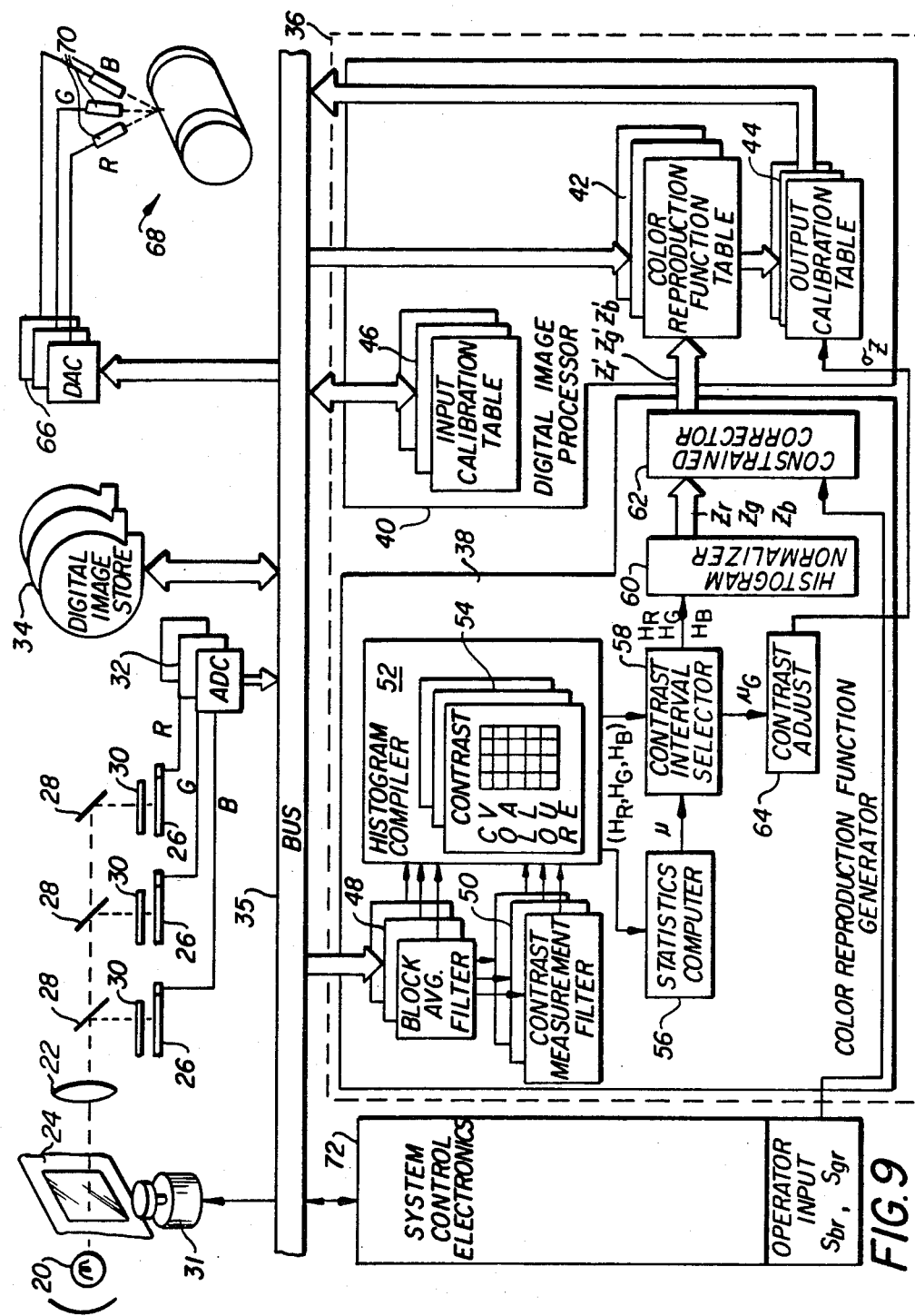
FIG. 9 is a schematic diagram showing apparatus for practicing a preferred mode of the present invention.

Turning now to FIG. 9, an example of a scanning printer used to practice the present invention will be described. The input device includes a light source 20 and lens 22 for projecting an image of color negative film 24 onto three solid state image sensing arrays 26, such as CCD image sensors. The image is directed to the image sensing arrays 26 by dichroic beam splitters 28 through color trimming filters 30 to form a red, green and blue separation image on the respective image sensors 26. A film advance motor 31 advances the film in the printer. The image sensors 26 scan the color photographic negatives to produce three color separation signals R, G and B. The signals thus produced are supplied to analog-to-digital converters 32 that each produce an 8-bit output code representing one of 256 possible signal levels for each sample point in the three colors.

The digital color image signals are stored in a digital image storage memory 34, such as a magnetic tape, disc, or solid state semiconductor memory. The digital color image signals were processed in a digital computer 36. A DEC 2060 mainframe computer was used in the initial experiments; later a special purpose digital image processing computer was used to increase the processing speed.

The digital computer 36 is programmed to include a color reproduction function generator 38 and a digital image processor 40 that applies color reproduction functions generated by color reproduction function generator 38 to the digital color image. The color reproduction function generator 38 receives the color digital image from the digital image storage device 34 via data and control bus 35 and generates a color reproduction function for each color. The color reproduction functions are supplied to the digital image processor 40 as color reproduction function look-up tables 42 that are used to process the digital color image. The color reproduction function generator 38 also generates a multiplicative constant $\sigma_z$ for adjusting the contrast of the processed image as described below and supplies the constant to output calibration tables 44 in the digital image processor 40.

Prior to storing the digital color image in digital image store 34, each input signal level is converted to an input color value (such as photographic density) by a known scanner calibration function. The calibration function for each color is implemented in the form of a look up table 46 in the digital image processor 40 to convert each 8-bit input value to an 8-bit value representing the color negative density at the scanning point.

The color reproduction function generator 38 includes digital filters 48 for performing a block average of the color values of the digital color image. Digital filters 50 detect the contrast of the image around each block averaged color value in each of the three colors. A histogram compiler 52 compiles the block averaged color values from a plurality of contrast intervals in each color in a plurality of histogram memories 54.

Figure 10:
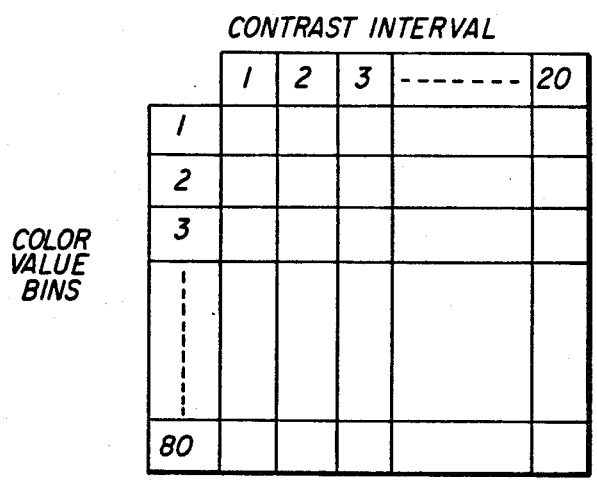
FIG. 10 is a schematic diagram illustrating the organization of the histogram memories used to compile the color value histograms in the apparatus of FIG. 9.

FIG. 10 shows, in a graphic way, the organization of one of the histogram memories 54 for one of the colors. There are twenty contrast intervals having a width of 0.04 log contrast units each. The width of the contrast intervals was chosen to be approximately twice the minimum visual log contrast threshold. The 256 color values are divided into 80 color value (density) bins, for a resolution of 0.05 density units per bin. Counts are accumulated in the appropriate color value bins in the histogram memories 54 until all of the color values from the digital color image are counted.

Returning to FIG. 9, a statistics computer 56 computes the first four standardized statistical moments $\mu$ of the distributions of color values in the histogram memories 54 as described below.

A contrast interval selector 58 selects a contrast interval on the basis of the statistics of the distributions of color values in the contrast intervals. The contrast interval selector 58 supplies the histograms from the selected contrast interval to a histogram normalizer 60. Histogram normalizer 60 normalizes the histograms of color values from the selected contrast interval to generate the color reproduction functions $Z_r$, $Z_g$ and $Z_b$.

A constrained corrector 62 receives the color reproduction functions $Z_r$, $Z_g$ and $Z_b$, and operator input constraints $S_{br}$ and $S_{gr}$ and corrects the color reproduction functions in correspondence with the constraints. The corrected color reproduction functions $Z'_r$, $Z'_g$ and $Z'_b$ are supplied as look-up table values to the color reproduction function look-up tables 42 in the digital image processor.

A contrast adjustment computer 64 receives the statistics $\mu_G$ of the green distribution from the contrast interval selector 58 and produces a multiplicative constant $\sigma_z$ used to determine the contrast of the processed image. The multiplicative constant $\sigma_z$ is provided to the output device calibration tables 44. Alternatively, the multiplicative constant $\sigma_z$ can be incorporated into the color reproduction functon tables 42. The color reproduction function look-up tables 42 relate each of the 256 possible input values in the respective colors to one of the 256 possible output values.

After the color reproduction function look-up tables 42 have been generated, the digital image processor 40 processes the digital image by applying the color reproduction functions to the respective color components of the digital color image. The output calibration functions are then applied to the respective color components of the processed digital color image. The processed digital color image is converted to analog form by digital-to-analog converters 66. The processed analog color signal is then applied to an output scanning device 68 to reproduce the processed color image.

The output device 68 is a drum-type scanner having red, green and blue laser light sources 70 that are modulated by the respective analog color signals to expose a light sensitive medium such as color photographic paper.

System control electronics 72 controls and coordinates the operation of input and output scanning devices and the signal processing computer and receives the operator input of the constraints $S_{br}$ and $S_{gr}$ for use by the constrained corrector 62.

The method of digital color image processing using corrected color reproduction functions and contrast adjustments will now be described in more detail with reference to the flow charts of FIGS. 11-15.

Referring first to the flow chart of FIG. 11, the processing steps performed on the digital color image to generate the respective color reproduction functions will be described. All three color components are processed through these steps. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} /16 \quad (24)$$

This averaging is performed by the block average filters 48 shown in FIG. 9 to reduce the effects of film grain on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix} \quad (25)$$

is applied to the block averaged color values of the digital color image to measure the contrast of the image at each block averaged sample point. This operation is performed by the contrast measurement filter 50 in FIG. 9. The Laplacian operator has the properites of exhibiting no response to uniform areas or linear gradients, and exhibiting a response only to changes in gradients. The Laplacian operator works well in measuring the contrast of the image; however, it is to be understood that other contrast measuring filters may be employed.

The respective histograms in each contrast interval for each color component are compiled as discussed above, and their statistics are computed. A contrast interval is selected on the basis of the statistical parameters of the color value distributions in the contrast interval, and the histograms of color values in the selected contrast interval are normalized to generate the respective color reproduction functions for each color.

The color reproduction functions are then corrected by applying constraints according to the present invention, and an overall contrast adjustment parameter $\sigma_z$ is calculated as a function of the standard deviation of the green color values in the selected contrast interval.

Figures 11, 12:
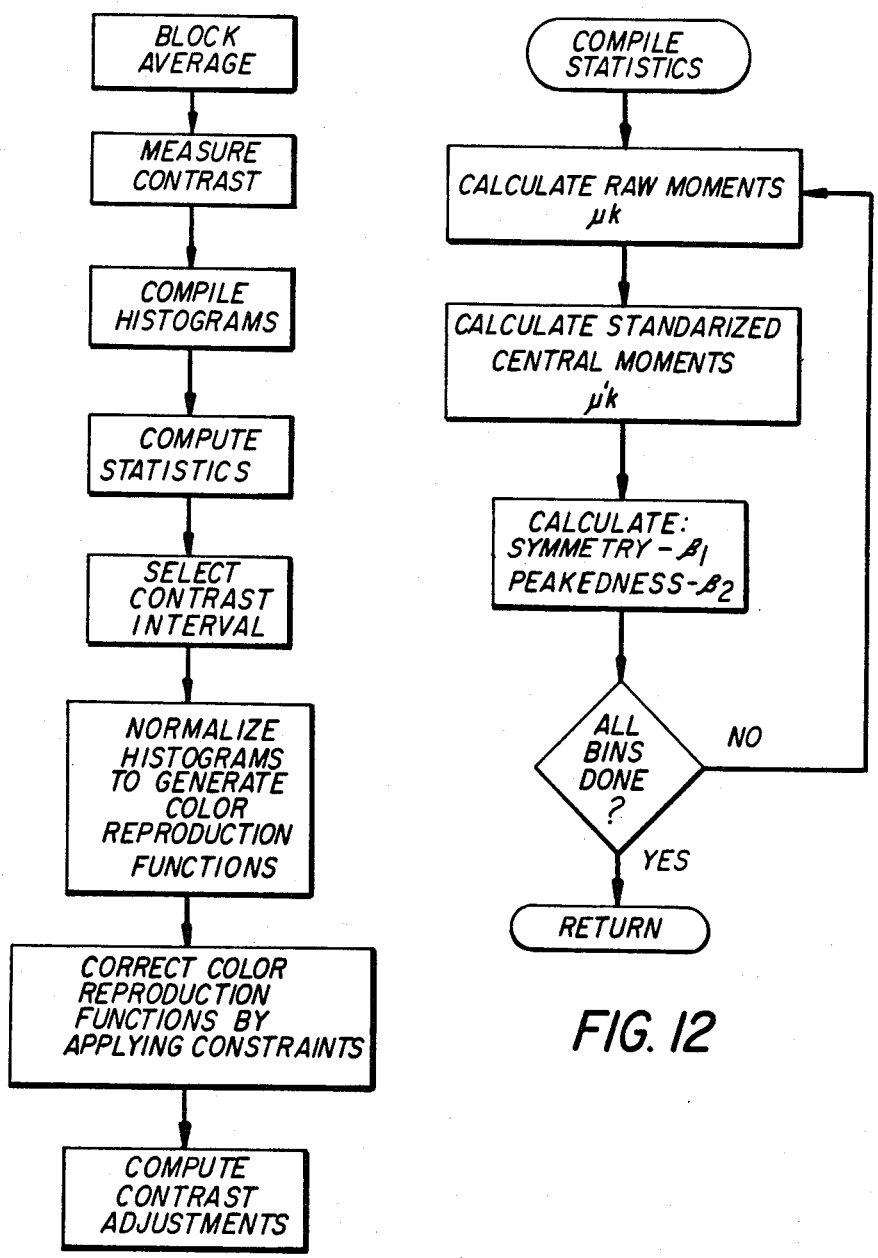
FIGS. 11–15 are flow charts illustrating the operation of the apparatus of FIG. 9, and carrying out the method of digital color image processing according to the present invention.

FIG. 12 is a flow chart showing the steps involved in compiling the histogram statistics for each contrast interval value. The raw moments $\mu_k$ taken about the mean, are computed as follows:

$$\mu_k = \frac{1}{N} \left( \sum_{i=1}^{N} (x_i - \bar{x})^k \right), \quad (26)$$

where
N is total number of samples in the contrast interval;
$x_i$ is a color value; and
$\bar{x}$ is the mean color value.

The standardized central moments $\mu'_k$ are calculated as follows:

$$\mu'_k = \frac{\mu_k}{\sigma^k}, \text{ where } \sigma = \sqrt{\mu_2}. \tag{27}$$

The coefficient of symmetry (skewness) for each distribution is then represented as:

$$\beta_1 = (\mu'_3)^2, \tag{28}$$

and the coefficient of peakedness (kurtosis plus 3) is represented as $$\beta_2 = \mu'_4. \tag{29}$$

Figures 13, 14:
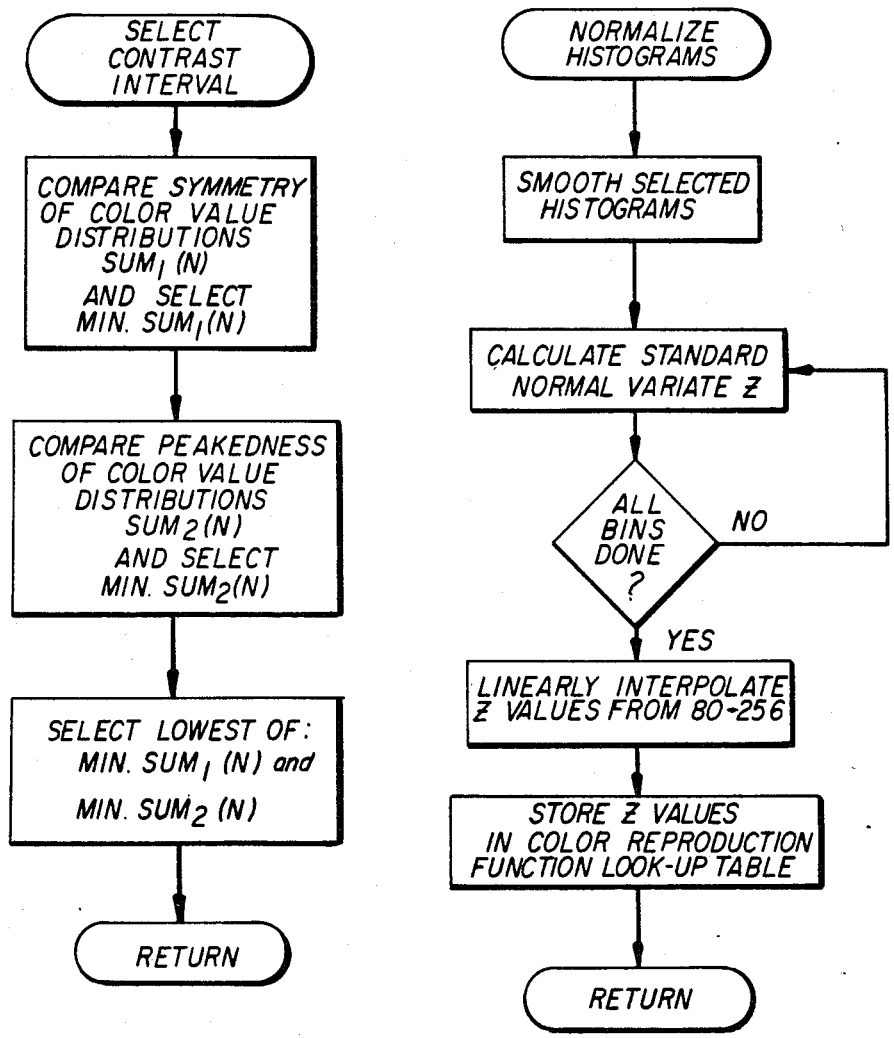
Figure 15:
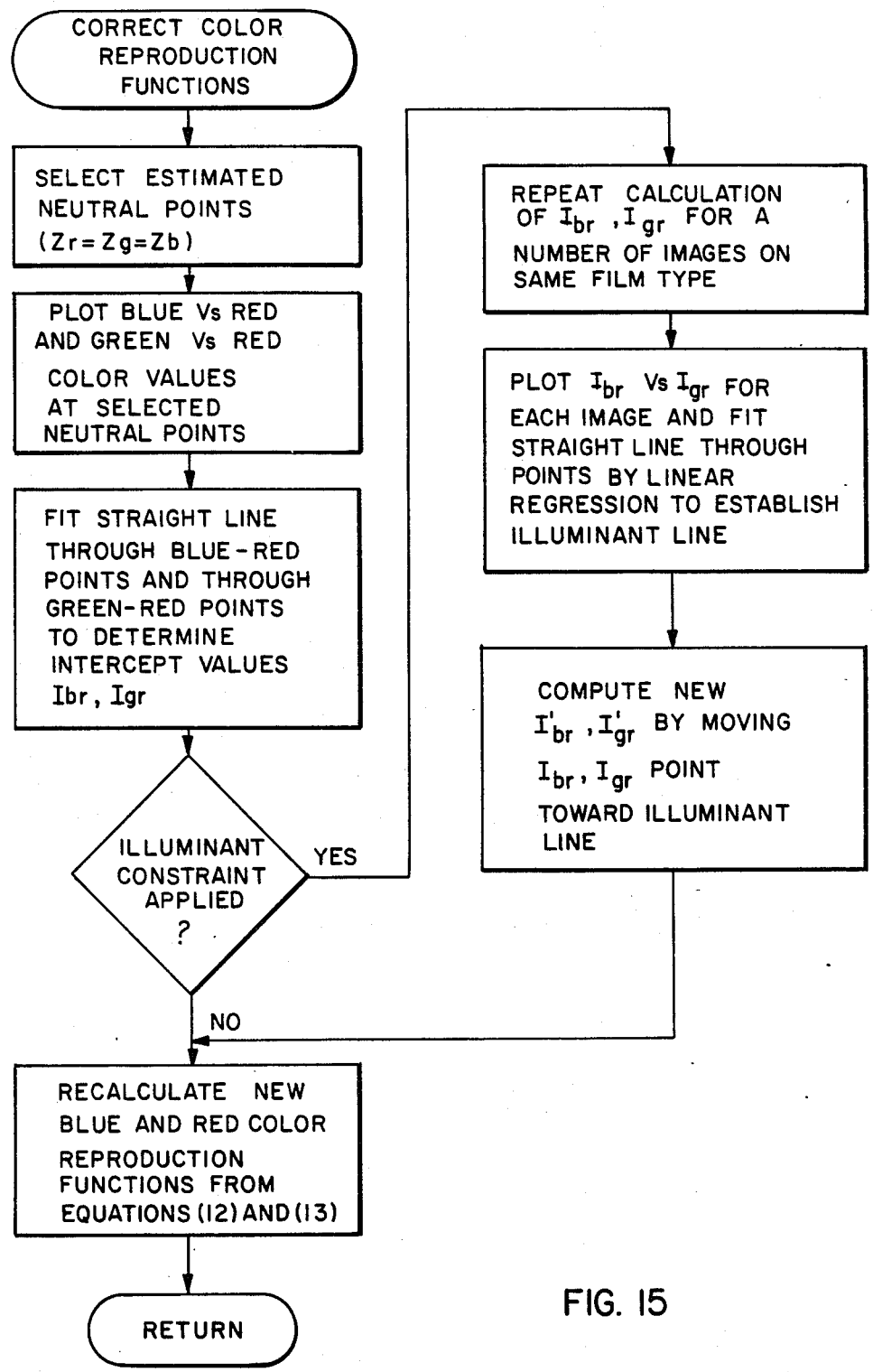

Referring to FIG. 13, the contrast interval selection criteria involves the similarity of shape of the three color distributions in the contrast interval. The selection criteria compares the symmetry of the color value distributions in each of the contrast intervals as follows:

$$SUM_1(N) = |\beta_{1R} - \beta_{1G}| + |\beta_{1B} - \beta_{1G}| + |\beta_{1R} - \beta_{1B}|, \tag{30}$$

Where $SUM_1(N)$ is a measure of the difference in skewness between the three color value distributions in the Nth contrast interval. The contrast interval having the most similar distribution, i.e. the lowest value of $SUM_1(N)$ is identified Next, the peakedness of the three color value distributions in each contrast interval is compared as follows:

$$SUM_2(N) = |\beta_{2R} - \beta_{2G}| + |\beta_{2B} - \beta_{2G}| + |\beta_{2R} - \beta_{2B}|, \tag{31}$$

where $SUM_2(N)$ is a measure of difference in peakedness between the three color value distributions in the Nth contrast interval. The contrast interval having the most similar distributions, i.e. the lowest value of $SUM_2(N)$ is identified.

Finally, the lowest contrast interval (i.e. the interval representing the lowest contrast) between the two identified contrast intervals is selected.

Turning now to FIG. 14, the steps involved in normalizing the color value histograms in the selected contrast interval to generate the color reproduction functions will be described. To normalize a histogram, the normal variate Z for all 80 color value bins in the contrast interval is computed. First however, an average smoothing operation is performed on the selected color value distribution to remove any spikes. The smoothing is performed on the counts in 3 consecutive color value bins as follows:

$$h_i = \tfrac{1}{3}(h'_{i-1} + h'_{i+1}), \tag{32}$$

where
$h'_i$ is the count in bin i; and
$h_i$ is the smoothed value.

Next, the normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2}, \tag{33}$$

where $$t_j = \sqrt{\ln(1/P_j^2)}$$

$a_0 = 2.30753 \quad b_1 = .99229$
$a_1 = 0.27061 \quad b_2 = .04481$

The cumulative probability $P_j$ for each of the 80 bins is given by $$P_j = \frac{\sum_{i=1}^{j} h_i}{\sum_{i=1}^{80} h_i}, \tag{34}$$

where
$h_i$ are the smoothed counts in the ith color value bin; and $j = 1 - 80$.

Figure 5:
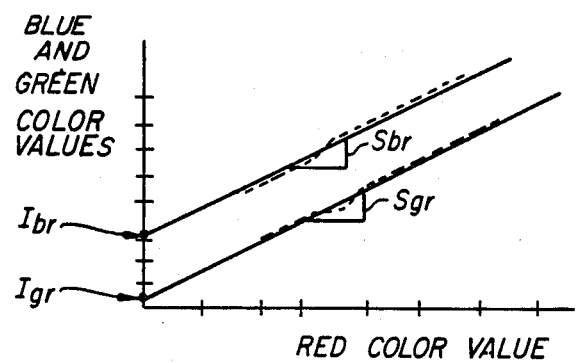
FIG. 5 is a plot of blue vs red and green vs red color values from a set of neutral points taken from the color reproduction functions illustrated in FIG. 4.
Figure 6:
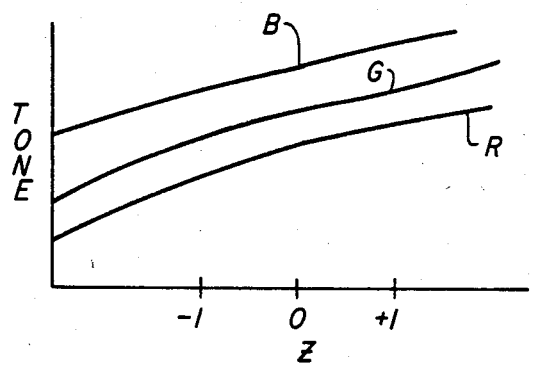
FIG. 6 is a graph showing the color reproduction functions of FIG. 4 corrected by applying a D-log H constraint according to the present invention.
Figure 7:
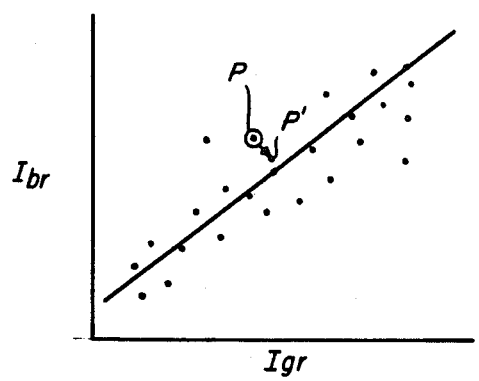
FIG. 7 is a plot of illuminant points ($I_{gr}$, $I_{br}$) for a number of images recorded on a color film having the D-log H characteristics shown in FIG. 3.
Figure 8:
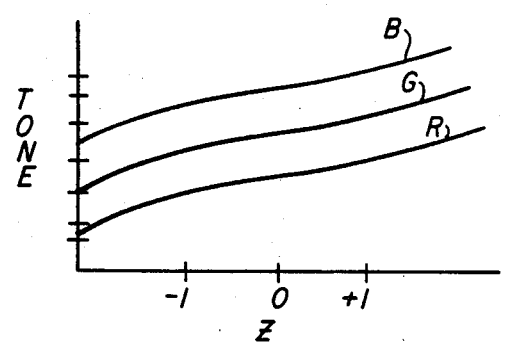
FIG. 8 is a graph showing the color reproduction functions of FIG. 4, corrected by applying the illuminant and D-log H constraints according to the present invention.

Next, the Z values are linearly interpolated from 80 to 256 values to provide a Z value for each of the 256 possible scanner input levels represented by the 8-bit digital code. Next, referring to FIG. 15, the method of correcting the color reproduction functions in conformity with the linear constraints will be explained. First, $I_{gr}$ and $I_{br}$ are calculated by selecting 21 estimated neutral points (i.e. points from the red, green and blue color reproducton functions having equal Z values). Increments along the Z axis of 0.2 standard deviations are used. Next, straight lines having slopes $S_{gr}$ and $S_{br}$ are fit to the green-red and blue-red points to determine $I_{br}$ and $I_{gr}$ as illustrated in FIG. 5, using linear regression. If only the D-Log H constraint is to be employed, the values of the blue and red color reproduction functions are then recalculated using the relationships defined in equations (12) and (13) to yield $Z'_b$ and $Z'_r$. If both the D-log H and the illuminant constraints are employed, the values of $I_{br}$ and $I_{gr}$ are measured and stored for a number of images recorded on this same film type. Then the illuminant line is computed by fitting a line through these points using a least squares fit method (FIG. 7).

Figure 3:
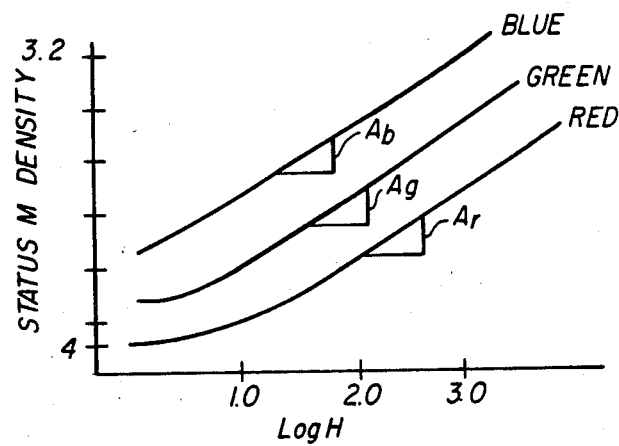
FIG. 3 is a graph showing a set of D-log H curves for a typical color photographic film.
Figure 2:
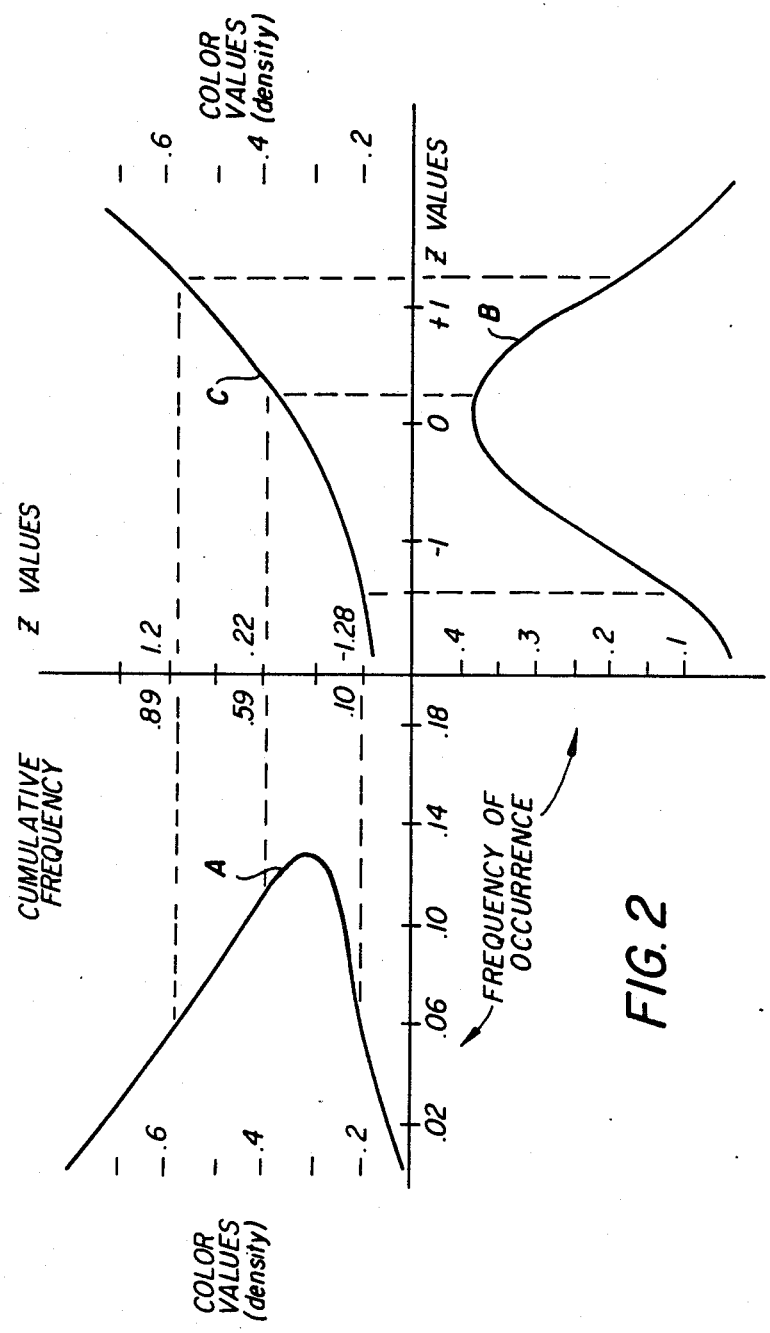
FIG. 2 is a graph useful in describing the color reproduction functions.

Alternatively, the illuminant line can be generated as follows. Using a series of different color temperature filters in a photographic printing light source, film of a given film type is exposed through a neutral density wedge. For example, seven different color temperature filters between 2650° K. and 10,000° K. were used to make seven exposures. The film was developed and the exposures were scanned in a color densitometer to generate a series of D-log H curves of the type shown in FIG. 3, one set of curves for each color temperature. Values of blue vs red and green vs red densities from the D-log H curves were then used to determine the intercept values $I_{gr}$ and $I_{br}$ as shown in FIG. 5. The $I_{gr}$, $I_{br}$ points thus obtained define the illuminant line as shown in FIG. 7.

Then, for any given image in the group, a new $I'_{gr}$, $I'_{br}$ is calculated by moving the illuminant point $I_{gr}$, $I_{br}$ toward the illuminant line. This correction, for example, moves the illuminant point some percentage of the distance toward the illuminant line, say 50% of the way. The corrected blue and red color reproduction functions $Z'_b$ and $Z'_r$ are calculated from equations (12) and (13) using $I'_{br}$ and $I'_{gr}$.

Finally the 256 Z values are stored in the color reproduction function look-up table 22. This process is applied to each of the three color value samples in the selected contrast interval.

After the corrected color reproduction function lookup tables are generated, all of the color values of the image are processed by applying the respective color reproduction functions to them. At this point the processed color values from the image are dimensionless quantities representing Z values.

To recover the processed image, these dimensionless quantities are given magnitudes with respect to the original image and the output medium by multiplying the Z values with a multiplier that adjusts the overall contrast of the processed image. To adjust the color balance of the image, a constant term is added to each of the three primary tone values. The additive constant term relates the processed image values to the density of the output medium for the respective color, thereby causing equal Z values in all three colors to be reproduced as a shade of gray.

Appropriate values for the multiplier that adjusts the overall contrast and the additive constants that determine the color balance are determined as follows. The multiplier is computed based on the statistics of the green color values alone, but is applied to all three colors.

The intrinsic contrast of natural scenes can be quantified in terms of the standard deviation of log reflectance of edges in the scene or the density representation of these log reflectances in the photographic image. On the average the approximate relationship between the two is given by:

$$\sigma_D = \overline{G} \cdot \sigma_R, \tag{35}$$

where
$\overline{G}$ = average gradient of the photographic film (relates $\sigma_R$ to some specific reproduction medium contrast);
$\sigma_R$ = standard deviation of log reflectance based on a large number of original scenes; and
$\sigma_D$ = standard deviation of density.

Typical values for $\sigma_R$ and $\overline{G}$ for color negative photographic film are 0.31 and 0.68 respectively, such that $\sigma_D$ is 0.21. Departures from this average contrast must be compensated. A general equation may be stated as:

$$\sigma_z = m \cdot f(\sigma_s) + b, \tag{36}$$

where
$\sigma_s$ = individual scene standard deviation, from the selected contrast interval;
m and b are system dependent constants;
$f(\sigma_s)$ is some function of the sample standard deviation; and
$\sigma_z$ = the multiplier applied to the values obtained from the color reproduction function.

A simple and satisfactory implementation is obtained from:

$$b = \sigma_D \cdot (1.0 - m) \tag{37}$$

$$\sigma_z = m \cdot \sigma_s + b, \tag{38}$$

where
m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

For example, if a color negative image is to be printed directly onto color photographic paper, the log exposure for the desired mean paper density for each color is simply added to the translated, contrast adjusted values of the respective colors. The complete calculation is given by:

$$\log E_{ZD} = -\sigma_z \cdot Z_D + \log E_A, \tag{39}$$

where
$\log E_A$ = log exposure required to obtain the aim paper density;
$Z_D$ = translated Z value for some input density in the original image; and
$\log E_{ZD}$ = log exposure for $Z_D$.

Industrial Applicability and Advantages

The method of processing digital color images according to the present invention is useful in the graphic arts and photographic printing fields to automatically adjust the color balance of digital color images produced from photographic color film. The method is advantageous in that a greater percentage of high quality images are produced automatically, without the need for operator intervention, than by the methods of the prior art. The method overcomes the problem of undesirable color shifts caused by color saturated texture such as green grass and blue sky noise.

What is claimed is:

1. A method of processing a digital color image, said image being produced from a photographic color film having a color response represented by a set of D-log H curves, by applying color reproduction functions to a plurality of color components of the digital color image, characterized by the steps of: constraining the shapes of the color reproduction functions in conformance with the shapes of the D-log H curves and constraining the relationships between the color reproduction functions in accordance with the assumption that an illuminant employed to expose the photographic color film was a black body radiator.

2. A method of processing a digital color image comprising a plurality of red, green and blue color values, said digital color image being produced from a photographic color film having a color response represented by red, green and blue D-log H curves, of the type employing red, green and blue color reproduction functions generated by normalizing samples of red, green and blue color values from informational portions of the digital image, the color reproduction functions being applied to red, green and blue color components of the digital color image to produce a processed digital color image, characterized by: the step of constraining the shapes of the red, green and blue color reproduction functions in accordance with red, green and blue D-log H curves, respectively, of the photographic color film.

3. The digital color image processing method claimed in claim 2, wherein the samples of red, green and blue color values employed to generate the red, green and blue color reproduction functions are obtained by the steps of: determining the contrast of the digital color image at each of the red, green and blue color values of the digital color image, separating the red, green and blue color values into a plurality of red, green and blue color value samples corresponding to a plurality of contrast intervals based upon the contrast of the digital color image at each color value, and selecting the red, green and blue color value samples corresponding to one of said plurality of contrast intervals based upon the similarity of the shapes of the distributions of the color values in said selected red, green and blue color value samples; and wherein said color reproduction functions are represented in terms of a normal variate Z (Z values).

4. The digital color image processing method claimed in claim 3, wherein the step of constraining the shapes of the color reproduction functions includes the step of determining the values of the quantities $$S_{gr} = A_g/A_r$$

and $$S_{br} = A_b/A_r$$

for the photographic color film, where $A_g$, $A_b$ and $A_r$ are the slopes of linear portions of the green, blue and red D-log H curves, respectively; selecting a plurality of pairs of blue and red color values and a plurality of pairs of green and red color values from the color reproduction functions, the two color values in each pair corresponding to the same Z value in their respective color reproduction functions; fitting, by linear regression, a first straight line having a slope $S_{br}$ to the selected pairs of blue and red color values and determining a blue intercept $I_{br}$ of the first straight line; fitting, by linear regression, a second straight line having a slope $S_{gr}$ to the selected pairs of red and green color values and determining a green intercept $I_{gr}$ of the second straight line; and recomputing the blue and red color reproduction functions according to the formulae $$B' = S_{br} \frac{G - I_{gr}}{S_{gr}} + I_{br}$$

and $$R' = \frac{G - I_{gr}}{S_{gr}},$$

respectively, where B' and R' are recomputed blue and red color values, respectively, at a given Z value and G is a green color value at the given Z value.

5. A method of processing a digital color image comprising a plurality of red, green and blue color values, said digital color image being produced from a photographic color film having a color response represented by red, green and blue D-log H curves, of the type employing red, green and blue color reproduction functions generated by normalizing samples of red, green and blue color values from informational portions of the digital color image, the color reproduction functions being applied to respective red, green and blue color components of the digital color image to produce a processed digital color image, characterized by the step of: constraining the relationships between the red, green and blue color reproduction functions in accordance with the assumption that the photographic color film was exposed by a black body radiator.

6. The digital color image processing method claimed in claim 5, wherein the samples of red, green and blue color values employed to generate the red, green and blue color reproduction functions are obtained by the steps of: determining the contrast of the digital color image at each of the red, green and blue color values of the digital color image, separating the red, green and blue color values into a plurality of red, green and blue color value samples corresponding to a plurality of contrast intervals based upon the contrast of the digital color image at each color value, and selecting the red, green and blue color value samples corresponding to one of said plurality of contrast intervals based upon the similarity of the shapes of the distributions of the color values in said selected red, green and blue color value samples; and wherein said color reproduction functions are represented in terms of a normal variate Z.

7. The digital color image processing method claimed in claim 6, wherein the step of constraining the relationships between the color reproduction functions includes the steps of: forming a linear illuminant constraint by measuring the response of a photographic color film of a given type to a plurality of light sources representing black body radiators at different temperatures; determining an illuminant point $(I_{br}, I_{gr})$ for the digital color image; calculating a new illuminant point $(I'_{br}, I'_{gr})$ by moving the illuminant point toward the linear illuminant constraint; and recomputing the blue and red color reproduction functions according to the formulae $$B' = S_{br} \frac{G - I'_{gr}}{S_{gr}} + I'_{br}$$

and $$R' = \frac{G - I'_{gr}}{S_{gr}}$$

where B' and R' are computed blue and red color values, respectively, at a given Z value and G is a green color value at the given Z value.

8. The digital color image processing method claimed in claim 7, wherein the step of calculating a new illuminant point $(I'_{br}, I'_{gr})$ moves the illuminant point $(I_{br}, I_{gr})$ halfway toward the linear illuminant constraint.

9. A method of processing a digital color image comprising a plurality of red, green and blue color values, said digital color image being produced from a photographic color film having a color response represented by red, green and blue D-log H curves, of the type employing red, green and blue color reproduction functions generated by normalizing samples of red, green and blue color values from informational portions of the digital color image, the color reproduction functions being applied to respective red, green and blue color components of the digital color image to produce a processed digital color image, characterized by the steps of: constraining the shapes of the red, green and blue color reproduction functions in accordance with the shapes of the red, green, and blue D-log H curves of the photographic color film; and constraining the relationships between the red, green, and blue color reproduction functions in accordance with the assumption that the photographic color film was exposed by a black body radiator.

10. The digital color image processing method claimed in claim 9, wherein the samples of red, green and blue color values employed to generate the red, green and blue color production functions are obtained by the steps of: determining the contrast of the digital color image at each of the red, green and blue color values of the digital color image, separating the red, green and blue color values into a plurality of red, green and blue color value samples corresponding to a plurality of contrast intervals based upon the contrast of the digital color image at each color value, and selecting the red, green and blue color value samples corresponding to one of said plurality of contrast intervals based upon the similarity of the shapes of the distributions of the color values in said selected red, green and blue color value samples; and wherein said color reproduction functions are represented in terms of a normal variate Z (Z values).

11. The digital color image processing method claimed in claim 10, wherein the steps of constraining the shapes of the color reproduction functions, and constraining the relationships between the color reproduction functions include the steps of: determining the values of the quantities $$S_{gr} = A_g/A_r$$

and $$S_{br} = A_b/A_r$$

for the photographic color film, where $A_g$, $A_b$ and $A_r$ are the slopes of linear portions of the green, blue and red D-log H curves, respectively; selecting a plurality of pairs of blue and red color values and a plurality of pairs of green and red color values from the color reproduction functions, the two color values in each pair corresponding to the same Z value in their respective color reproduction functions; fitting, by linear regression, first and second straight lines having respective slopes $S_{br}$ and $S_{gr}$ to the blue and red pairs and green and red pairs, respectively, of color values and determining a blue intercept $I_{br}$ and a green intercept $I_{gr}$ of the first and second straight lines, respectively; generating an illuminant constraint by repeating the step of determining $I_{br}$ and $I_{gr}$ for a plurality of different images on the same type of photographic color film to generate a plurality of illuminant points ($I_{gr}$, $I_{br}$), and fitting a straight line, by a least squares fit, to the illuminant points to generate an illuminant line; for the digital color image being processed, forming a corrected illuminant point ($I'_{gr}$, $I'_{br}$) by adjusting the value of $I_{gr}$, $I_{br}$ toward the illuminant line; and recomputing the blue and red color reproduction functions according to the formulae:

$$B' = S_{br}\frac{G - I'_{gr}}{S_{gr}} + I'_{br}$$

and $$R' = \frac{G - I'_{gr}}{S_{gr}}$$

respectively, where B' and R' are the recomputed blue and red color values, respectively, at a given Z value and G is the green color value at the given Z value.

12. The digital color image processing method claimed in claim 10, wherein the steps of constraining the shapes of the color reproduction functions, and constraining the relationships between the color reproduction functions include the steps of:
determining the values of the quantities $$S_{gr} = A_g/A_r$$

and $$S_b = A_b/A_r$$

for the photographic color film, where $A_g$, $A_b$ and $A_r$ are the slopes of linear portions of the green, blue and red D-log H curves, respectively;

selecting a plurality of pairs of blue and red color values and a plurality of pairs of green and red color values from the color reproduction functions, the two color values in each pair corresponding to the same Z value in their respective color reproduction functions;

fitting, by linear regression, first and second straight lines having slopes $S_{br}$ and $S_{gr}$, respectively, to the blue and red pairs and green and red pairs, respectively, of color values and determining a blue intercept $I_{br}$ and a green intercept $I_{gr}$ of the first and second straight lines, respectively, the intercepts defining an illuminant point ($I_{br}$, $I_{gr}$) for the digital color image;

generating an illuminant constraint by exposing samples of the photographic color film through a neutral density wedge and a plurality of different color temperature filters, generating a plurality of sets of D-log H curves from said exposed samples, with each set of curves corresponding to a different color temperature, selecting a plurality of pairs of blue and red densities and a plurality of pairs of green and red densities from each of said plurality of sets of D-log H curves, the two densities in each pair corresponding to the same log H value on their respective D-log H curves, fitting a straight line to the pairs of densities selected from each set of D-log H curves to determine an illuminant point ($I_{br}$, $I_{qr}$) for each color temperature, and fitting a straight line through the illuminant points for said color temperatures to define a linear illuminant constraint;

for the digital color image being processed, forming a corrected illuminant point ($I'_{br}$, $I'_{gr}$) by adjusting the value of the illuminant point ($I_{br}$, $I_{gr}$) for the digital color image toward the illuminant constraint; and recomputing the blue and red color reproduction functions according to the formulae:

$$B' = S_{br}\frac{G - I'_{gr}}{S_{gr}} + I'_{br}$$

and $$R' = \frac{G - I'_{gr}}{S_{gr}}$$

respectively, where B' and R' are the recomputed blue and red color values, respectively, at a given Z value and G is the green color value at the given Z value.

* * * * *